(12) United States Patent
Kageyama et al.

(10) Patent No.: US 7,363,614 B2
(45) Date of Patent: Apr. 22, 2008

(54) AUTOMATIC TEST PROGRAM GENERATION METHOD

(75) Inventors: Naohiro Kageyama, Atsugi (JP); Zentaro Hirose, Hadano (JP); Michiyuki Kawauchi, Higashimurayama (JP); Takeshi Fukuma, Hadano (JP)

(73) Assignees: Hitachi, Ltd., Tokyo (JP); Hitachi Information Technology Co., Ltd., Ashigarakami-Gun, Kanagawa (JP)

( * ) Notice: Subject to any disclaimer, the term of this patent is extended or adjusted under 35 U.S.C. 154(b) by 749 days.

(21) Appl. No.: 10/760,366

(22) Filed: Jan. 21, 2004

(65) Prior Publication Data

US 2004/0210874 A1 Oct. 21, 2004

(30) Foreign Application Priority Data

Jan. 21, 2003 (JP) ............................. 2003-011970

(51) Int. Cl.
G06F 9/445 (2006.01)
(52) U.S. Cl. ...................................... 717/124; 717/126
(58) Field of Classification Search ................. 703/21, 703/22; 714/38; 717/124, 126, 151; 712/217
See application file for complete search history.

(56) References Cited

U.S. PATENT DOCUMENTS

| | | | |
|---|---|---|---|
| 4,014,777 A | 3/1977 | Brown | |
| 4,081,656 A | 3/1978 | Brown | |
| 4,200,062 A | 4/1980 | Duckworth | |
| 4,369,737 A | 1/1983 | Sanders et al. | |
| 4,622,924 A | 11/1986 | Lewis | |
| 4,726,888 A | 2/1988 | McCambridge | |
| 5,231,954 A | 8/1993 | Stowe | |
| 5,244,558 A | 9/1993 | Chiang | |
| 5,401,371 A | 3/1995 | Oshima et al. | |
| 5,437,250 A | 8/1995 | Rabinovich et al. | |
| 5,628,885 A | 5/1997 | Lin | |
| 5,692,122 A * | 11/1997 | Bird ........................... | 714/38 |
| 5,711,865 A | 1/1998 | Caesar | |
| 5,843,292 A | 12/1998 | Spiros | |
| 5,997,223 A | 12/1999 | Spiros | |
| 6,209,493 B1 | 4/2001 | Ross | |
| 6,223,337 B1 * | 4/2001 | Blume ........................ | 717/126 |
| 6,299,656 B1 | 10/2001 | Richardson, Jr. et al. | |
| 6,322,757 B1 | 11/2001 | Cohn et al. | |
| 6,430,741 B1 * | 8/2002 | Mattson et al. ............. | 717/154 |
| 6,507,809 B1 * | 1/2003 | Yoshino et al. ............... | 703/21 |
| 6,560,958 B1 | 5/2003 | Bromberg et al. | |
| 6,880,154 B2 * | 4/2005 | Ghosh et al. ................ | 717/151 |
| 7,065,631 B2 * | 6/2006 | Weaver ....................... | 712/217 |

* cited by examiner

*Primary Examiner*—Albert W. Paladini
(74) *Attorney, Agent, or Firm*—Antonelli, Terry, Stout & Kraus, LLP.

(57) ABSTRACT

Architecturally complicated computers require functionally complicated compiler. For such a compiler, the present invention provides an automatic compiler test program generation method capable of reducing the man-hour required to prepare a test program and testing many aspects of the compiler.

By a random number-used method, a plurality of program cells are selected from a set of program cells each of which may form an element of a test program. The selected program cells are combined into a test program.

17 Claims, 7 Drawing Sheets

| ITEM NO. | CELL NAME | CELL TYPE | CELL WEIGHT | CELL DESCRIPTION TABLE INFORMATION | |
| --- | --- | --- | --- | --- | --- |
| | | | | POINTER | DESCRIPTION LENGTH |
| 1 | C01 | BASIC CELL | 1 | 0 | 156 |
| 2 | C02 | BASIC CELL | 3 | 156 | 214 |
| 3 | C03 | CONTROL CELL | 1 | 370 | 81 |
| 4 | C04 | CONTROL CELL | 1 | 451 | 149 |
| 5 | C05 | FUNCTION CELL | 2 | 600 | 211 |
| ⋮ | ⋮ | ⋮ | ⋮ | ⋮ | ⋮ |

FIG. 9

| ADDRESS | 0 | 1 | 2 | 3 | 4 | 5 | 6 | ... |
| --- | --- | --- | --- | --- | --- | --- | --- | --- |
| CHARACTER | i | n | t | | | | | ... |

FIG. 10

| EXECUTION ORDER | SELECTED CELL POINTER |
|---|---|
| 1 | 5 |
| 2 | 3 |
| 3 | 2 |
| 4 | 10 |
| | ⋮ |

FIG. 11

- STRUCTURE DECLARATION — 1110
- FUNCTION DEFINITION — 1120
- #include STATEMENTS — 1130

AUTOMATIC TEST PROGRAM GENERATION METHOD

BACKGROUND OF THE INVENTION

The present invention relates to test program preparation methods and, more specifically, to a method for generating a test program used to test compilers under development.

Programs written in high level language are converted to executable forms by compilers. In the development of a compiler, test programs are prepared in order to verify its functions. Conventionally, such a test program is manually prepared by the designer of the compiler or an expert familiar with the language specification.

On the other hand, some approaches have also been proposed aimed at automatic generation of a test program by a computer. One of them is to select rules from prepared plural syntax generation rules by means of random numbers and generates a test program based on the selected rules as disclosed in Japanese Patent Laid-open No. 1-220044. Another approach is to check the grammatical coverage of an existing test program, output the non-covered grammars as a reduced set of grammars and automatically generate an additional test program based on the reduced set of grammars as disclosed in Japanese Patent Laid-open No. 3-75840. In still another approach, statement patterns are generated based on syntactic rules described in the Backus Naur form and the generated statement patterns are manually edited into a test program as disclosed in Japanese Patent Laid-open No. 6-214775.

Any of these automatic test program generation methods automatically generate single statements in a test program.

SUMMARY OF THE INVENTION

To remove functional defects from a compiler, it is necessary to test the compiler by using many prepared test programs. However, architecturally complicated recent computers require complicated compiler functions. To test all functions of a compiler, an enormous amount of manpower is needed if the test programs are manually prepared as conventional. Therefore, functional verification may not satisfactorily be done before the compiler is shipped.

To cope with this situation, automatic test program generation methods have so far been proposed as mentioned above. However, these methods are to generate single statements. Hard-to-find serious functional problems are generally caused by structurally complicated programs. They do occur not within statements but across plural statements if many conditions are met. Such functional problems are difficult to find by the conventional automatic generation methods designed to mainly generate single statements.

According to an automatic test program generation method by the present invention, a plurality of partial program descriptions (sub-procedural descriptions, called program cells, each of which may form an element of a test program) are selected by a random number-used method and combined into a test program.

DESCRIPTION OF THE PREFERRED EMBODIMENTS

The following will describes embodiments of the present invention with reference to the drawings.

Figure 1:
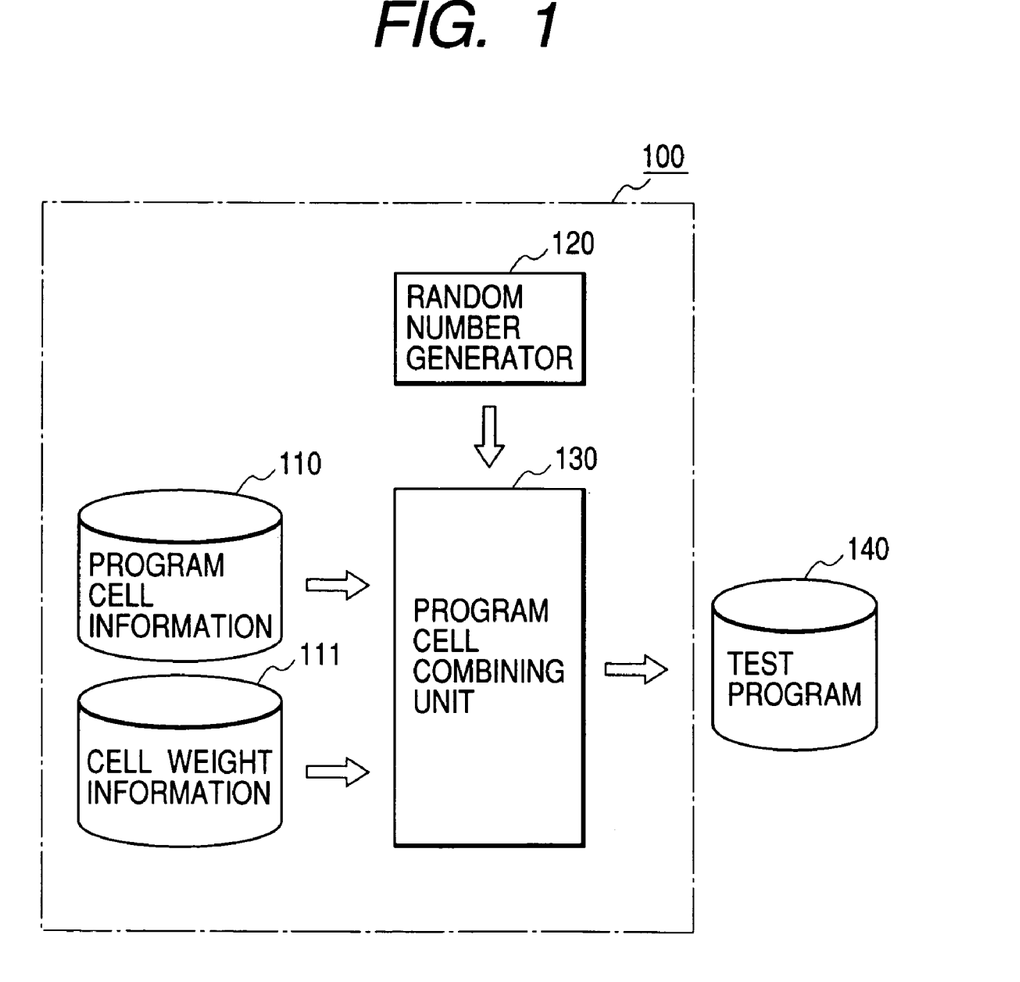
FIG. 1 shows an example of a configuration of a test program generator.

FIG. 1 shows an example of a configuration of a test program generator 100 that automatically generates a test program for a compiler by implementing an automatic test program generation method of the present invention. The test program generator 100 shown as the present embodiment is realized, for example, by software that operates on a personal computer.

In FIG. 1, program cell information 110, stored in a memory unit of a computer, is a set of pieces of information, each of which describes part of the program. As described later in detail with reference to FIGS. 3, 4, 5 and 11, program cells (also denoted simply as cells) are components of the test program. Each cell is given a weight as specified by cell weight information 111. The cell weights are treated in such a manner that giving a higher weight to a program cell raises the probability of the program cell being selected when specific program cells are selected from the program cell set by using random numbers. Based on random numbers generated by a random number generator 120, a program cell combining unit 130 selects program cells and combines the selected program cells to generate a test program 140.

Weights are given to such cells as those in which tested program bugs were found in the past and those in which bugs are likely to be found. This weighting can be changed on an each test basis.

Figure 2:
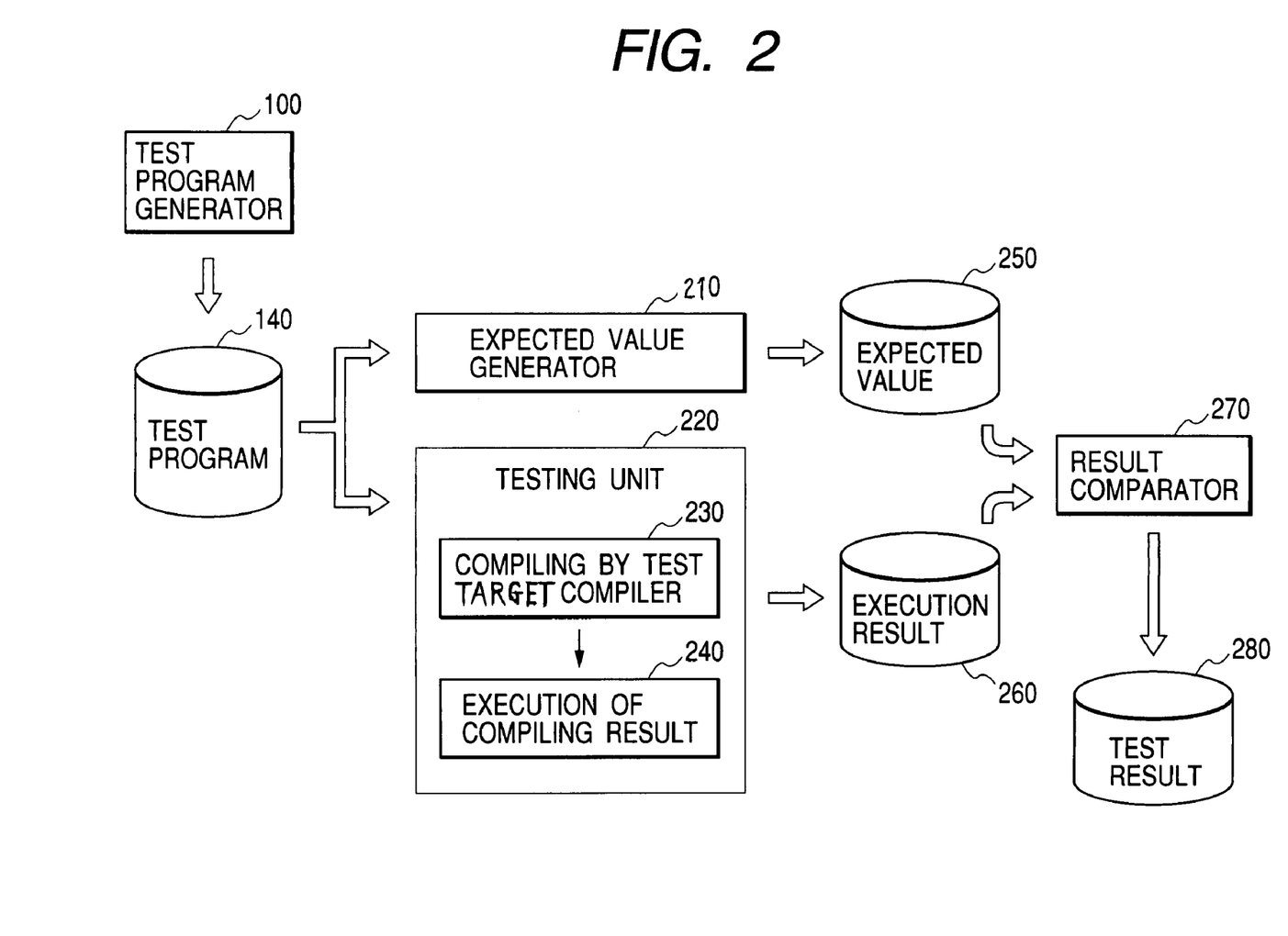
FIG. 2 shows an example of a configuration of a compiler test system.

FIG. 2 shows an example of a configuration of a compiler test system that incorporates the test program generator 100 described with FIG. 1. This system is implemented, for example, by software that operates on a personal computer. A test program 140, which is an output of the test program generator 100, is entered into a testing unit 220. In the testing unit 220, the test program is compiled (230) by the test target compiler. Then, an executable file obtained by the compilation is executed (240) and the result is stored as an execution result 260 in a storage unit.

The same test program 140 is also entered into an expected value generator 210. The expected value generator 210 can be implemented, for example, by using a compiler which has been proven through practical use. The test program is compiled to an executable file by the proven compiler and then executed. An expected value 250 obtained by entering the test program 140 into the expected value generator 210 and the execution result 260 are entered into a result comparator 270. The comparison result is stored as a test result 280 in a storage unit of the computer.

Before a test program is generated as described later in detail with reference to FIG. 7, each cell is tested alone to check the integrity of the cell itself. In addition, although the above-mentioned test result of the test program is a result of executing a plurality of cells combined into one program, the test result is configured to indicate which cell is abnormal if any.

By using PADs, FIGS. 3 to 6 and 11 show program cells configured as proposed by the present invention. In the following description, the program cells are classified into four types: basic cells, control cells, function cells and declaration/definition cells.

Figure 3:
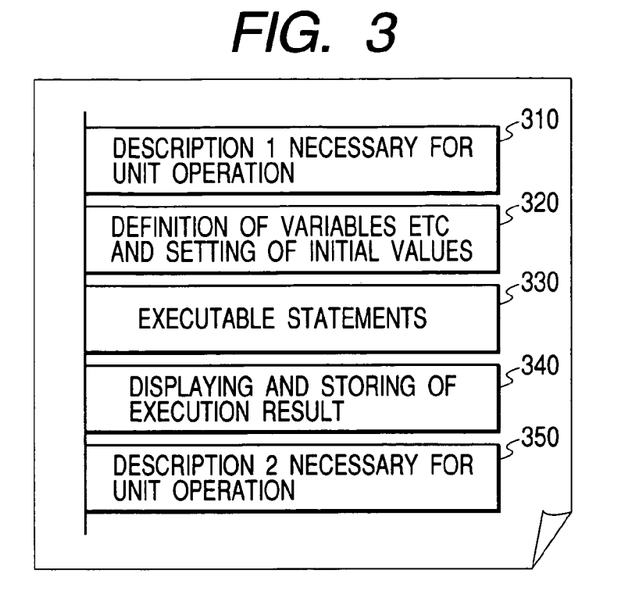
FIG. 3 shows an example of a configuration of a basic cell.

FIG. 3 is a PAD showing an example of a configuration of the basic cell. The basic cell is a program cell where "Definition of Variables etc. and Setting of Initial Values" 320, "Executable Statements" 330 and "Displaying and Storing of Execution Result" 340 are described in the order of execution. Further, "Description 1 Necessary for Unit Operation" 310 and "Description 2 Necessary for Unit Operation" 350 are included which are necessary to separately compile/execute the basic cell. By means of optional specification at compilation, it is possible to control "Description 1 Necessary for Unit Operation" 310 and "Description 2 Necessary for Unit Operation" 350 so as to compile and operationally check the basic cell as a single unit.

For example, "Description 1 Necessary for Unit Operation" 310 may be written as follows:

```
#ifdef_CELL_COMPILE_CHECK_
    void main( ) {
#endif
```

Likewise, "Description 2 Necessary for Unit Operation" 350 may be written as follows:

```
#ifdef_CELL_COMPILE_CHECK_
    }
#endif
```

Unless the token_CELL_COMPILE_CHECK_is defined, the cell cannot be compiled/executed as a single cell. To compile/execute a test program made of program cells combined, the token_CELL_COMPILE_CHECK_is not defined.

In "Definition of Variables etc. and Setting of Initial Values" 320, variables and others necessary to compile/execute the basic cell are defined and initialized. In addition to variables, constants, macros, etc. can be defined.

"Displaying and Storing of Execution Result" 340 is described to present the execution result of the basic cell on a display unit connected to the computer and store it in a storage unit. By this, while a test program incorporating program cells is being executed, the test operator can grasp the test program's operational progress in detail.

Figure 4:
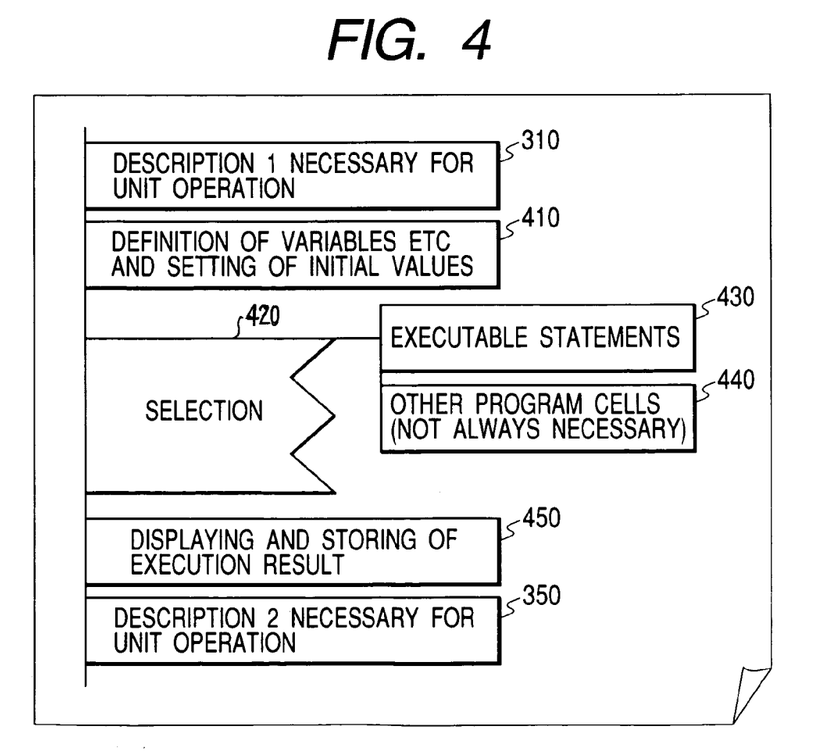
FIG. 4 shows an example of a configuration of a select cell.
Figure 5:
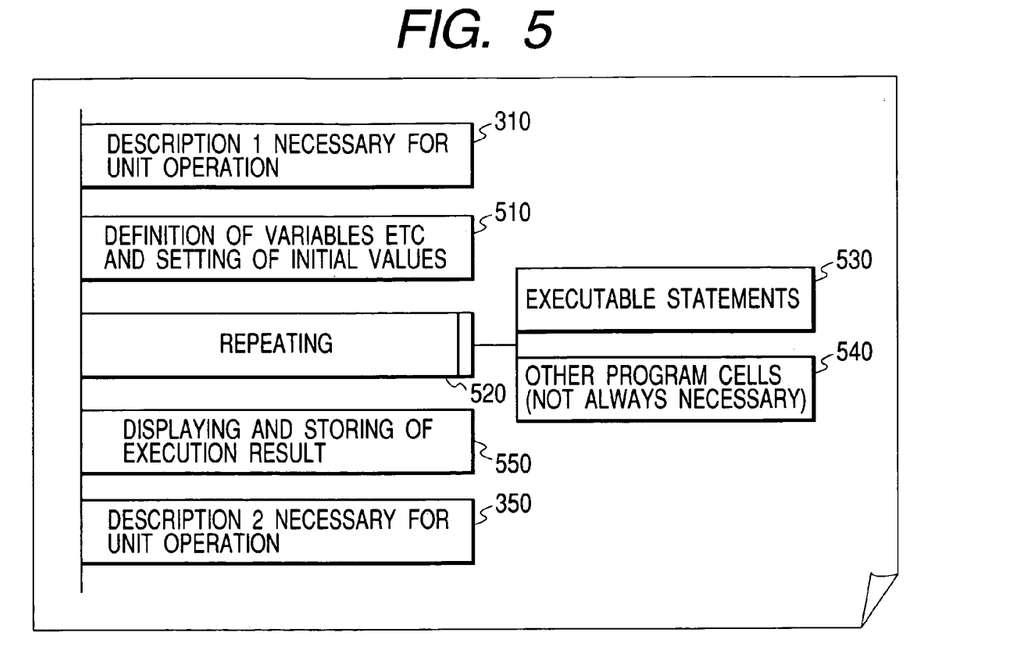
FIG. 5 shows an example of a configuration of a repeat cell.

FIGS. 4 and 5 are PADS for showing examples of configurations of control cells. In this embodiment, the control cells are classified into select cells as shown in FIG. 4 and repeat cells as shown in FIG. 5. Either cell incorporates "Description 1 Necessary for Unit Operation" 310 and "Description 2 Necessary for Unit Operation" 350. Therefore, by means of optional specification at compilation, it is possible to control "Description 1 Necessary for Unit Operation" 310 and "Description 2 Necessary for Unit Operation" 350 so as to compile and operationally check the control cell as a single cell.

FIG. 4 is a PAD showing an example of a configuration of the select cell. Like in a basic cell, "Definition of Variables etc. and Setting of Initial Values" 410 is described to define and initialize variables and others which are necessary to compile/execute the select cell on the computer. "Selection" 420 is described so as to invoke "Executable Statements" 430 depending on conditions described therein. Each select cell can have "other program cells" 440 nested therein although it can also be executed with no other program cell nested therein. Like in a basic cell, "Displaying and Storing of Execution Result" 450 is described to present the execution result of the select cell on a display unit connected to the computer and store it in a storage unit.

FIG. 5 is a PAD showing an example of a configuration of a repeat cell. Like in a basic or select cell, "Definition of Variables etc. and Setting of Initial Values" 510 is described to define and initialize variables and others which are necessary to compile/execute the select cell on the computer. "Repeating" 520 is described to repeatedly invoke "Executable Statements" 530. Similar to a select cell, a repeat cell can have "Other Program Cells" 540 nested therein, too. "Displaying and Storing of Execution Result" 550, like in a basic or select cell, is described to present the execution result of the repeat cell on a display unit connected to the computer and store it in a storage unit.

Figure 6:
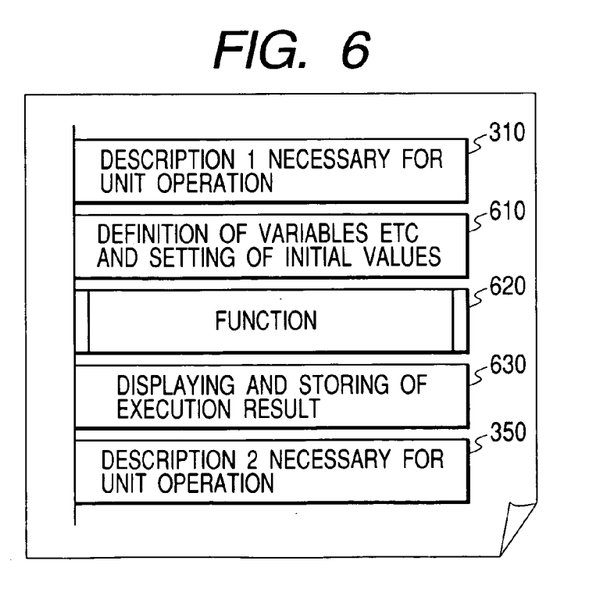
FIG. 6 shows an example of a configuration of a function cell.

FIG. 6 is a PAD showing an example of a configuration of a function cell. Similar to basic and control cells, each function cell can be executed alone. "Description 1 Necessary for Unit Operation" 310 and "Description 2 Necessary for Unit Operation" 350 are incorporated. Therefore, by means of optional specification at compilation, it is possible to control "Description 1 Necessary for Unit Operation" 310 and "Description 2 Necessary for Unit Operation" 350 so as to compile and operationally check the function cell as a single cell. "Definition of Variables etc. and Setting of Initial Values" 610, like in basic and control cells, is described to define and initialize variables and others which are necessary to compile/execute the function cell on the computer. "Function" 620 is described to call a function defined in another place. "Displaying and Storing of Execution Result" 630, like in basic and control cells, is described to present the execution result of the function cell on a display unit connected to the computer and store it in a storage unit.

Figure 11:
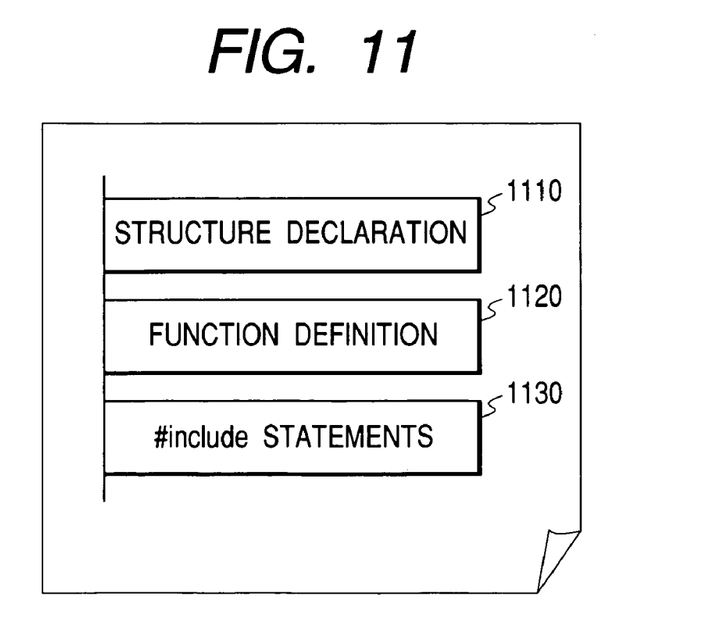
FIG. 11 shows an example of a declaration/definition (declaration and definition) cell.

FIG. 11 is a PAD showing an example of a configuration of a declaration/definition cell. In the declaration/definition cell, structures which are to be shared by other program cells are declared, functions are defined and #include statements are described. When program cells are combined into a test program, one declaration/definition cell is always placed at the head.

Figure 7:
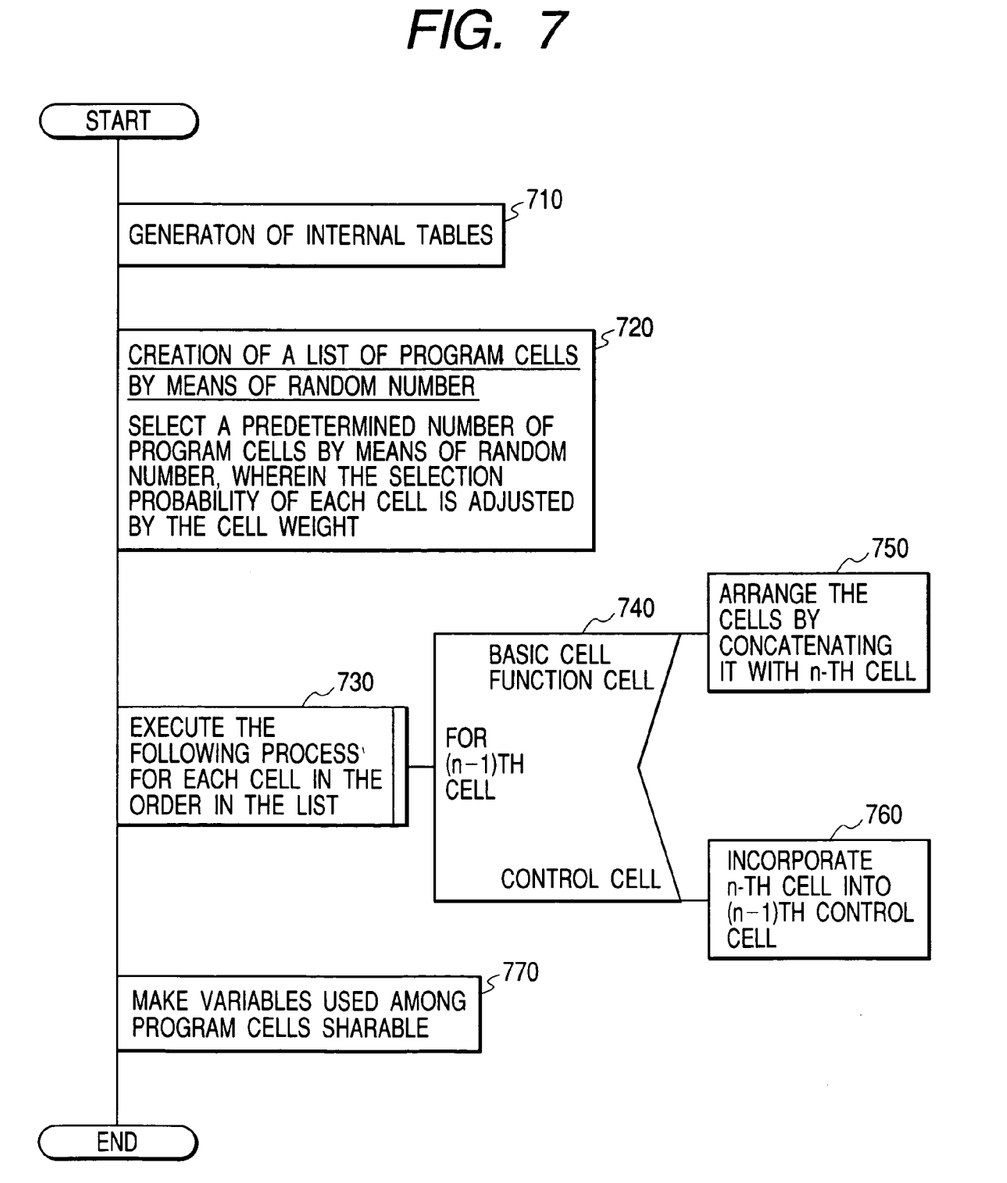
FIG. 7 shows an example of a process sequence by a program cell combining unit.

FIG. 7 shows a process sequence performed by the program cell combining unit 130 of FIG. 1. The program cell information 110 comprising basic, control, function and declaration/definition cells, shown respectively in FIG. 3 to FIG. 6 and FIG. 11, and the cell weight information 111 are taken in from storage units of the computer. Then, the program cell combining unit 130 selects program cells by using random numbers generated by the random number generator 120, and combine them to generate a test program 140. This process sequence will be described later in detail.

Figure 8:
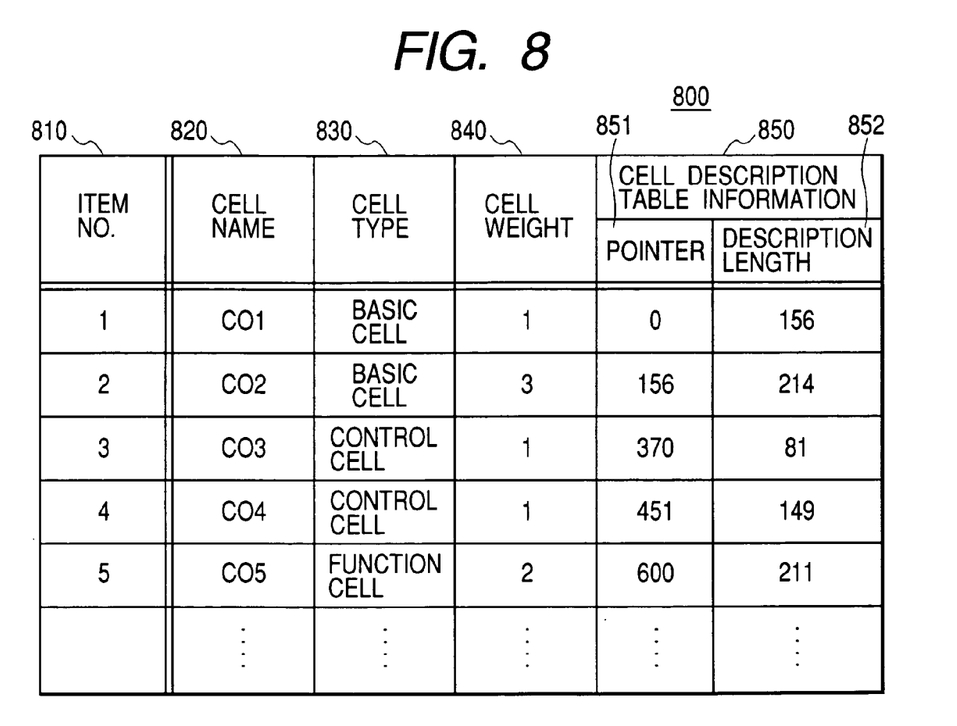
FIG. 8 shows an example of a cell management table.
Figure 9:
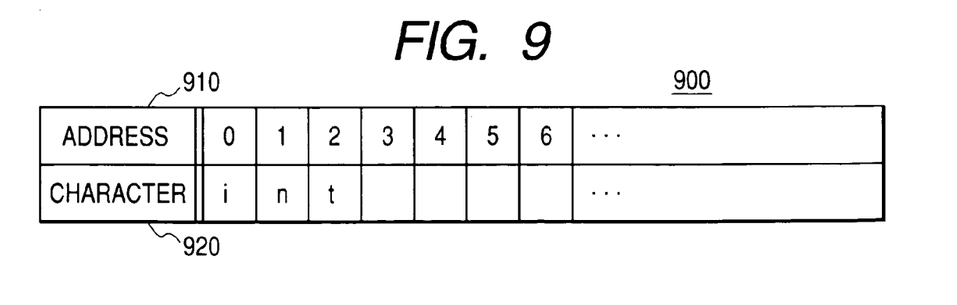
FIG. 9 shows an example of a cell description table.
Figure 10:
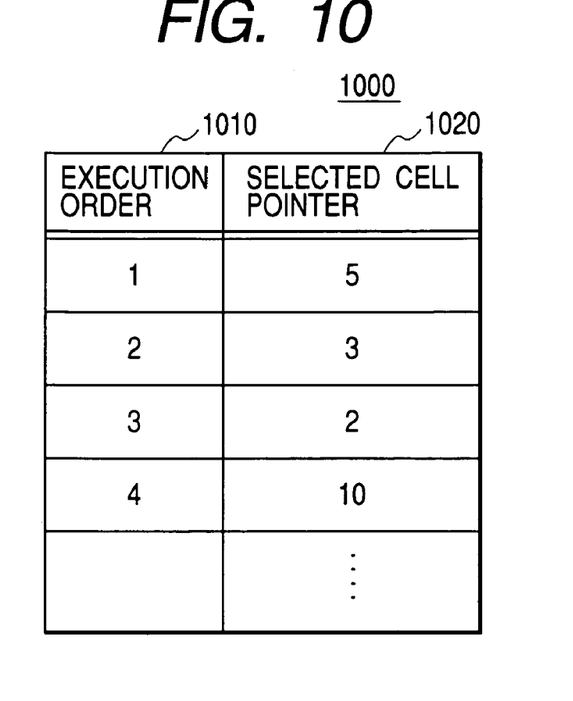
FIG. 10 shows an example of a selected-cell table.

FIGS. 8, 9 and 10 show examples of tables which are to be formed in the main memory of the computer when the process sequence of FIG. 7 is implemented by computer software. FIG. 8 shows a cell management table 800. In an item number column 810, the entry number of each cell is stored. In a cell name column 820, each cell's name is stored. A cell type column 830 stores each cell's cell type: basic, control, function or declaration/definition.

In a cell weight column 840, a value given to each cell is stored, reflecting the probability of the cell being selected using a random number from those registered to the cell management table. For example, the selecting scheme may be designed in such a manner that the probability of a weight 2 program cell being selected is twice as high as that of a weight 1 program cell being selected. In a cell description table information column 850, information about a cell description table 900 is stored. The cell description table information column 850 is divided into a pointer column 851 and a description length column 852. The pointer column 851 indicates the address of the first character of each cell's corresponding cell description in a cell description table 900 whereas the description length column 852 indicates the length of the cell description with the number of characters therein.

FIG. 9 shows an example of the cell description table 900. The cell description table 900 has an address row 910 and a character row 920. The address row 910 indicates the address of each character stored in the cell description table 900 whereas the character row 920 stores each character of each cell description. For example, consider cell No. 1 in FIG. 8. As the cell description table information 850 regarding the cell No. 1, 0 and 156 are respectively stored in the pointer column 851 and description length column 852. This means that the description of cell No. 1 starts at address 0 and ends at address 155 in FIG. 9. Note that any character stored therein, whether it is an alphanumeric, space, line feed symbol or something else, is assumed as necessary for cell description. Therefore, when cell No. 1 in FIG. 8 is to be executed, characters are read out from addresses 0 through 155 in FIG. 9.

FIG. 10 shows an example of a configuration of a selected cell table 1000. The selected cell table 1000 has an execution order column 1010 and a selected cell pointer column 1020. The execution order column 1010 indicates what number entry each program cell, selected using a random number according to the process sequence shown in FIG. 7, is in the selected cell table (what number cell each selected cell is in the test program). The selected cell pointer column 1020 indicates what cell No. is attached in the cell management table 800 to each cell which is selected using a random number according to the process sequence shown in FIG. 7.

With reference to the tables shown in FIGS. 8 to 10, the following describes how the program cell combining unit implements the process sequence shown in FIG. 7.

In the process sequence shown in FIG. 7, the program cell information 110 and the cell weight information 111 in FIG. 1 are deployed into the cell management table 800 in FIG. 8 and the cell description table 900 in FIG. 9 by "Generation of Internal Tables" 710. "Creation of a List of Program Cells by Means of Random Number" 720 selects program cells from those registered with the cell management table 800 by using random numbers generated by the random number generator 120. The probability of each cell being selected is controlled based on the weight 840 given to the cell in the cell management table 800. For example, this probability control may be designed in such a manner that the probability of a weight 3 program cell being selected is three times as high as that of a program cell given a cell weight of 1. Each selected program cell is registered with the selected cell table 1000. That is, the execution order column 1010 stores the numbers of the selected cells in the order of selection whereas the selected cell pointer column 1020 stores the item Nos. given in the cell management table 800 to the selected program cells.

In the order of registration with the selected cell table 1000, the following process is performed for each program cell registered with the selected cell table 1000 (730). It is judged whether the program cell preceding the current cell is a basic/function cell or a control cell (740) and, if the preceding cell is a basic cell or a function cell, the current cell is concatenated to the preceding cell (750). If the preceding cell is a control cell, the current program cell is nested into the control cell (760).

Then, variables are made sharable among the program cells which are arranged to constitute a test program according to the above-mentioned procedure (770). Making a variable sharable means making its variable name common among the cells so that an operation result in a program cell can be reflected in the subsequent operation in a later cell. Although variables are defined uniquely in program cells, making variable sharable herein allows data exchange among the program cells.

According to the process sequence mentioned so far, it is possible to automatically generate a test program.

Since the program cells are classified into types and the cells to be executed and their order of execution are determined based on the type of each program cell, it is possible to generate a variety of test programs necessary to test a compiler.

The above-mentioned embodiment can automatically generate a satisfactory test program for testing a compiler by selecting program cells in the order of execution from a plurality of program cells by using random numbers based on cell weights assigned to the program cells. The selected cells are combined into a test program. Further, since selection tendency of the selected program cells can be changed by adjusting cell weights, it is possible to direct the test program to specific defects which are liable to occur in the compiler. Accordingly, this automatic test program generation can reduce the man-hour required to generate a test program and makes it possible to test many aspects of a compiler.

According to the present invention, it is possible to automatically generate a variety of test programs.

What is claimed is:

1. An automatic compiler test program generation method, comprising the steps of:
    selecting a plurality of sub-procedural descriptions by a random number-used method from a set of sub-procedural descriptions, each of which may form an element of a compiler test program; and
    combining the selected sub-procedural descriptions in accordance with the selected order to generate a compiler test program,
    wherein the sub-procedural description includes as a type of basic sub-pocedural description that lists executable statements in the order of execution, a control-sub-procedural description that describes how to repeat a procedure, a control sub-procedural description that describes how to select a procedure, and a function sub-procedural description that describes statements to call a function; and
    wherein the sub-procedural description includes statements necessary for a stand-alone execution, a definition to define and initialize variables as well as to define constants and macros, and statements to display and store an execution result.

2. An automatic compiler test program generation method according to claim 1, wherein each sub-procedural description is assigned a value which indicates the probability of the sub-procedural description being selected and the value is reflected in the random number-used selection of sub-procedural descriptions.

3. An automatic compiler test program generation method according to claim 1, wherein variables included in the selected plural sub-procedural descriptions are made shared by the selected sub-procedural descriptions when the selected sub-procedural descriptions are combined.

4. An automatic compiler test program generation method, comprising the steps of:
selecting a plurality of program cells by a random number-used method from a set of program cells, each of which may form an element of a test program for a compiler after being compiled by the compiler; and
combining the selected program cells in accordance with the selected order to generate a test program,
wherein the program cell includes as a type of a basic cell that lists executable statements in the order of execution, a control cell that describes how to repeat a procedure, a control cell that describes how to select a procedure, and a function cell that describes statements to call a function; and
wherein the program cell includes statements necessary for a stand-alone execution, a definition to define and initialize variables as well as to define constants and macros, and statements to display and store an execution result.

5. An automatic compiler test program generation method according to claim 4, wherein the selected program cells are registered with a table in the order of selection and the registered cells are given the following combining process in the order of registration:
(1) if the cell preceding the current program cell is said basic cell or said function cell, the current cell is concatenated to the preceding cell; and
(2) if the cell preceding the current program cell is said control cell, the current program cell is nested into the preceding cell.

6. An automatic compiler test program generation method according to claim 4, wherein the variables included in the selected plural program cells are made sharable among the selected program cells when the selected program cells are combined by the combining process.

7. A compiler test system comprising:
test program generation means for generating a test program;
testing means for taking in the generated test program, compiling the test program by using a test target compiler and outputting an execution result;
expected value generating means for taking in the generated test program, compiling the test program by using a proven compiler and outputting an expected value; and
result comparison means for taking in the execution result and the expected value for comparison with each other and storing the comparison result in a storage unit as a test result,
wherein the test program generation means selects a plurality of sub-procedural descriptions by a random number-used method from a set of sub-procedural descriptions, each of which may form an element of a test program for a compiler, and combines the selected sub-procedural descriptions to generate the test program;
wherein the sub-procedural description includes as a type of a basic sub-procedural description that lists executable statements in the order of execution, a control sub-procedural description that describes how to repeat a procedure, a control sub-procedural description that describes how to select a procedure, and a function sub-procedural description that describes statements to call a function;
wherein the sub-procedural description includes statements necessary for a stand-alone execution, a definition to define and initialize variables as well as to define constants and macros, and statements to display and store an execution result; and
wherein the statements for the stand-alone execution are made ineffective when compiling the test program.

8. A compiler test method comprising the steps of:
generating a test program;
taking in the generated test program, compiling the test program by using a test target compiler and outputting an execution result;
taking in the generated test program, compiling the test program by using a proven compiler and outputting an expected value;
taking in the execution result and the expected value for comparison with each other; and
storing the comparison result in a storage unit as a test result,
wherein the step of generating the test program comprises the sub-steps of:
selecting a plurality of sub-procedural descriptions by a random number-used method from a set of sub-procedural descriptions, each of which may form an element of a test program for a compiler; and
combining the selected sub-procedural description to generate a test program;
wherein the sub-procedural description includes as a type of a basic sub-procedural description that lists executable statements in the order of execution, a control sub-procedural description that describes how to repeat a procedure, a control sub-procedural description that describes how to select a procedure, and a function sub-procedural description that describes statements to call a function;
wherein the sub-procedural description includes statements necessary for a stand-alone execution, a definition to define and initialize variables as well as to define constants and macros, and statements to display and store an execution result; and
wherein the statements for the stand-alone execution are made ineffective when compiling the test program.

9. A program product for allowing a computer to execute a functional verification process for a compiler, said functional verification process comprising the steps of:
selecting a plurality of sub-procedural descriptions by a random number-used method from a set of sub-procedural descriptions, each of which may form an element of a test program for a compiler;
combining the selected sub-procedural descriptions in accordance with the selected order to generate a test program;
taking in the generated test program, compiling the test program by using a test target compiler and outputting an execution result;
taking in the generated test program, compiling the test program by using a proven compiler and outputting an expected value;
taking in the execution result and the expected value for comparison with each other; and storing the comparison result in a storage unit as a test result, wherein the sub-procedural description includes as a type of a basic sub-procedural description that lists executable statements in the order of execution, a control sub-procedural description that describes how to repeat a procedure, a control sub-procedural description that describes how to select a procedure, and a function sub-procedural description that describes statements to call a function;

wherein the sub-procedural description includes statements necessary for a stand-alone execution, a definition to define and initialize variables as well as to define constants and macros, and statements to display and store an execution result; and wherein the statements for the stand-alone execution are made ineffective when compiling the test program.

10. An automatic compiler test program generation method, comprising the steps of:

selecting a plurality of sub-procedural descriptions by a random number-used method from a set of sub-procedural descriptions, each of which may form an element of a compiler test program; and combining the selected sub-procedural descriptions in accordance with the selected order to generate a compiler test program, wherein the sub-procedural description includes as a type a basic sub-procedural description that lists executable statements in the order of execution, a control sub-procedural description that describes how to repeat a procedure, a control sub-procedural description that describes how to select a procedure, and a function sub-procedural description that describes statements to call a function;

wherein the sub-procedural description includes statements necessary for a stand-alone execution, a definition to define and initialize variables as well as to define constants and macros, and statements to display and store an execution result; and wherein the combining step combines the sub-procedural descriptions in such a manner as: if the selected sub-procedural description preceding the current sub-procedural description is the basic sub-procedural description or the function sub-procedural description, the current sub-procedural description is concatenated to the preceding sub-procedural description; and if the selected sub-procedural description preceding the current sub-procedural description is the control sub-procedural description, the current sub-procedural description is nested into the preceding sub-procedural description.

11. An automatic compiler test program generation method according to claim 10, wherein each sub-procedural description is assigned a value which indicates the probability of the sub-procedural description being selected and the value is reflected in the random number-used selection of sub-procedural descriptions.

12. An automatic compiler test program generation method according to claim 10, wherein variables included in the selected plural sub-procedural descriptions are made shared by the selected sub-procedural descriptions when the selected sub-procedural descriptions are combined.

13. An automatic compiler test program generation method, comprising the steps of:

selecting a plurality of program cells by a random number-used method from a set of program cells, each of which may form an element of a test program for a compiler after being compiled by the compiler; and combining the selected program cells in accordance with the selected order to generate a test program, wherein the program cell includes as a type a basic cell that lists executable statements in the order of execution, a control cell that describes how to repeat a procedure, a control cell that describes how to select a procedure, and a function cell that describes statements to call a function;

wherein the program cell includes statements necessary for a stand-alone execution, a definition to define and initialize variables as well as to define constants and macros, and statements to display and store an execution result; and wherein the combining step combines the program cells in such a manner as: if the selected program cell preceding the current program cell is the basic cell or the function cell, the current program cell is concatenated to the preceding program cell; and if the selected program cell preceding the current program cell is the control cell, the current program cell is nested into the preceding program cell.

14. An automatic compiler test program generation method according to claim 13, wherein the variables included in the selected plural program cells are made sharable among the selected program cells when the selected program cells are combined by the combining process.

15. A compiler test system comprising:

test program generation means for generating a test program;

testing means for taking in the generated test program, compiling the test program by using a test target compiler and outputting an execution result;

expected value generating means for taking in the generated test program, compiling the test program by using a proven compiler and outputting an expected value; and result comparison means for taking in the execution result and the expected value for comparison with each other and storing the comparison result in a storage unit as a test result, wherein the test program generation means selects a plurality of sub-procedural descriptions by a random number-used method from a set of sub-procedural descriptions each of which may form an element of a test program for a compiler, and combines the selected sub-procedural descriptions to generate the test program;

wherein the sub-procedural description includes as a type a basic sub-procedural description that lists executable statements in the order of execution, a control sub-procedural description that describes how to repeat a procedure, a control sub-procedural description that describes how to select a procedure, and a function sub-procedural description that describes statements to call a function;

wherein the sub-procedural description includes statements necessary for a stand-alone execution, a definition to define and initialize variables as well as to define constants and macros, and statements to display and store an execution result;

wherein the statements for the stand-alone execution are made ineffective when compiling the test program; and wherein the combining step combines the sub-procedural descriptions in such a manner as: if the selected sub-procedural description preceding the current sub-procedural description is the basic sub-procedural description or the function sub-procedural description, the current sub-procedural description is concatenated to the preceding sub-procedural description; and if the selected sub-procedural description preceding the current sub-procedural description is the control sub-procedural description, the current sub-procedural description is nested into the preceding sub-procedural description.

16. A compiler test method comprising the steps of:
generating a test program;
taking in the generated test program, compiling the test program by using a test target compiler and outputting an execution result;
taking in the generated test program, compiling the test program by using a proven compiler and outputting an expected value;
taking in the execution result and the expected value for comparison with each other; and
storing the comparison result in a storage unit as a test result,
wherein the step of generating the test program comprises the sub-steps of:
selecting a plurality of sub-procedural descriptions by a random number-used method from a set of sub-procedural descriptions each of which may form an element of a test program for a compiler; and
combining the selected sub-procedural description to generate a test program;
wherein the sub-procedural description includes as a type a basic sub-procedural description that lists executable statements in the order of execution, a control sub-procedural description that describes how to repeat a procedure, a control sub-procedural description that describes how to select a procedure, and a function sub-procedural description that describes statements to call a function;
wherein the sub-procedural description includes statements necessary for a stand-alone execution, a definition to define and initialize variables as well as to define constants and macros, and statements to display and store an execution result;
wherein the statements for the stand-alone execution are made ineffective when compiling the test program; and
wherein the combining step combines the sub-procedural descriptions in such a manner as: if the selected sub-procedural description preceding the current sub-procedural description is the basic sub-procedural description or the function sub-procedural description, the current sub-procedural description is concatenated to the preceding sub-procedural description; and if the selected sub-procedural description preceding the current sub-procedural description is the control sub-procedural description, the current sub-procedural description is nested into the preceding sub-procedural description.

17. A program product for allowing a computer to execute a functional verification process for a compiler, said functional verification process comprising the steps of:
selecting a plurality of sub-procedural descriptions by a random number-used method from a set of sub-procedural descriptions, each of which may form an element of a test program for a compiler;
combining the selected sub-procedural descriptions in accordance with the selected order to generate a test program;
taking in the generated test program, compiling the test program by using a test target compiler and outputting an execution result;
taking in the generated test program, compiling the test program by using a proven compiler and outputting an expected value;
taking in the execution result and the expected value for comparison with each other; and
storing the comparison result in a storage unit as a test result,
wherein the sub-procedural description includes as a type a basic sub-procedural description that lists executable statements in the order of execution, a control sub-procedural description that describes how to repeat a procedure, a control sub-procedural description that describes how to select a procedure, and a function sub-procedural description that describes statements to call a function;
wherein the sub-procedural description includes statements necessary for a stand-alone execution, a definition to define and initialize variables as well as to define constants and macros, and statements to display and store an execution result;
wherein the statements for the stand-alone execution are made ineffective when compiling the test program; and
wherein the combining step combines the sub-procedural descriptions in such a manner as: if the selected sub-procedural description preceding the current sub-procedural description is the basic sub-procedural description or the function sub-procedural description, the current sub-procedural description is concatenated to the preceding sub-procedural description; and if the selected sub-procedural description preceding the current sub-procedural description is the control sub-procedural description, the current sub-procedural description is nested into the preceding sub-procedural description.

* * * * *